United States Patent Office 3,692,575
Patented Sept. 19, 1972

3,692,575
METHOD FOR THE PRODUCTION OF DISPENSER CATHODE FOR ELECTRONIC DISCHARGE VESSELS
Wolfgang Nestler, Munich, Germany, assignor to Siemens Aktiengesellschaft
No Drawing. Continuation of application Ser. No. 606,003, Dec. 30, 1966. This application Oct. 23, 1970, Ser. No. 83,673
Claims priority, application Germany, Jan. 19, 1966, S 101,520
Int. Cl. B44d 1/02; H01j 9/00
U.S. Cl. 117—213  2 Claims

ABSTRACT OF THE DISCLOSURE

A method of providing a layer of metal of the platinum group, i.e., osmium, iridum, on the cathode of a dispenser cathode structure, by the separation through chemical extraction out of an appropriate soluble compound of the metal, for example, oxide hydrate or chloride, with reduction, possibly in an $H_2$ atmosphere, and sintering.

---

This is a continuation of application Ser. No. 606,003, filed Dec. 30, 1966, now abandoned.

The invention relates to a method for the production of a cathode for electronic discharge vessels, in the operation of which cathode emission substances migrate out of an emission material supply, through fine openings in a porous emission material carrier, covering an emission material supply, towards the cathode surface. In such cathodes the emission base support at the cathode surface is formed by an additional metal layer of at least one metal of the platinum group, which layer is applied to a tungsten disk which maintains its fine openings during operation, and sintered in porous manner.

As a tungsten disk, sintered in porous manner, is employed as the emission material carrier, it is assumed in the case of the mentioned known cathodes that such disk retains its permeability at high temperatures. Such a disk sintered out of a high melting metal such as tungsten has the advantage that there is no danger of a sintering together and therewith an undesired closure of the fine pores thereof at the normal operating temperatures.

Such a construction of the emission material carrier in which an additional metal layer serves as an emission base consisting, for example, of at least one metal of the platinum group, is utilized to obtain a lower electron affinity in a dispenser cathode than can be obtained in a cathode with an emission layer structure of barium on tungsten. Such a decrease of the electron affinity enables an appropriate temperature reduction and therewith an improvement of the basic qualities of a cathode regarding, for example, its economy, useful life, etc. But it has become evident that technologically the evaporating on of such metal layers is not a simple operation as the operation normally must take place in a vacuum, usually at high temperatures. To this there is added the fact that in some cases, for example in the case of osmium, the cost of the metal itself becomes of importance so that economy in the operation of the application process must be achieved.

It is therefore the problem of the invention to develop in the production of a dispenser cathode such as initially described herein, a simple chemical method which makes it possible to coat an emission material carrier disk of tungsten sintered in porous manner, of an MK cathode with a layer of at least one metal of the platinum group, in particular with an osmium layer, and to thereby impart thereto the advantageous qualities of a dispenser cathode with reduced electron affinity.

In the production of a cathode for electronic discharge vessels in the operation of which emission substances migrate from an emission material supply through fine openings of an emission material carrier, covering such supply, towards the cathode surface, and in which cathode the emission base is formed at the cathode surface by an additional metal layer out of at least one metal of the platinum group, which layer is applied on a tungsten disk, which retains its fine openings during operation, and sintered in porous manner, this is obtained according to the invention by the feature that the metal layer, serving as the emission base, is separated through a chemical deposition from an appropriate soluble compound, in particular out of an oxygen compound, possibly reduced in an $H_2$ atmosphere, and sintered on.

In the utilization of osmium for the base layer, it is of special advantage to employ an aqueous solution of an osmium oxygen compound, in particular $OsO_4$ (osmium oxide). In the use of other metals such as, for example, iridium or platinum itself, one proceeds from the corresponding hydrochloric acid as the solubility of the oxides or oxide hydrates involved would be too small. However, in this case the elimination of any Cl residuals must be effected with special care.

For practical execution of the method in the production of an osmium layer, the pressed and sintered tungsten disk is pickled in a mixture of water, hydrogen peroxide and ammonia, given a single short rinse with deionized water, taken out of the water by means of a plastic tweezers or the like, laid in a dish with the emission surface facing upwardly, and then covered with a 2% aqueous solution of $OsO_4$ (osmium oxide). After approximately 10 to 15 minutes the porous disk is coated with a uniform gray to black coating which at first essentially contains osmium.

After sufficient rinsing of the disk in de-ionized water, for example, three times, and an interim drying at approximately 100° C. in a drying oven, the reduction is effected at 1200° C. for approximately 15 minutes in a hydrogen atmosphere, possibly with the occurrence of a crystallization, to form a metallically shiny osmium coating.

A particularly important advantage of the described method is the attainment of good adhesive strength of the layer so formed, in particular an osmium layer, for among other reasons, because a certain depth of penetration is achieved during the separation. The method, which is operative practically without losses, requires only an extremely small expenditure with respect to apparatus.

Changes may be made within the scope and spirit of the appended claims which define what is believed to be new and desired to have protected by Letters Patent.

I claim:
1. A method of producing a cathode for electronic discharge vessels, said cathode including a porously sintered tungsten carrier member having an emission base on the cathode surface comprised of a layer of an additional metal, and an emission substance for migration through said porous carrier member toward said cathode surface, comprising the steps of:
applying an aqueous solution containing water-soluble osmium oxide onto a surface of said porous carrier member;
maintaining contact between said solution and said carrier for a period of time sufficient for the osmium oxide to penetrate and coat substantially all surfaces of said carrier member; and
subjecting said coated carrier member to a heated hydrogen atmosphere for a period of time sufficient to reduce said osmium oxide to metallic osmium and sinter said metallic osmium onto said carrier member while retaining the porosity of said carrier member.

2. A method of producing a cathode for electronic discharge vessels, said cathode including a porously sintered tungsten carrier member having an emission base on the cathode surface comprised of a layer of an additional metal, and an emission substance for migration through said porous carrier member toward said cathode surface, comprising the steps of:

pickling at least the surface of said porous carrier member that is to receive said additional layer thereon with a mixture of water, hydrogen peroxide and ammonia;

rinsing said surface with deionized water;

applying a 20% aqueous solution of osmium oxide onto said surface;

maintaining contact between said solution and said surface for about 10 to 15 minutes so that the osmium oxide penetrates and coats substantially all surfaces of said carrier member with a gray-to-black coating;

rinsing said coated surface with deionized water;

and sintering said coated surface in an atmosphere hydrogen for about 15 minutes at temperatures of about 1200° C. to reduce said osmium oxide to metallic osmium and adhere said metallic osmium to said surface while retaining the porosity of said carrier member.

References Cited
UNITED STATES PATENTS

| | | | |
|---|---|---|---|
| 1,890,859 | 12/1932 | Mavrogenis | 117—227 |
| 2,226,720 | 12/1940 | Hansell | 117—227 |
| 2,353,635 | 7/1944 | Aicher | 252—514 |
| 2,525,262 | 10/1950 | Macksound | 117—224 |
| 3,155,864 | 11/1964 | Coppola | 117—223 |
| 3,373,307 | 3/1968 | Zalm | 117—231 |

ALFRED L. LEAVITT, Primary Examiner

W. E. BALL, Assistant Examiner

U.S. Cl. X.R.

117—227, 230, 231; 313—346 DC